UNITED STATES PATENT OFFICE.

DENNIS FLANNERY, OF BROOKLYN, NEW YORK.

IMPROVEMENT IN COMPOSITIONS FOR SURFACING LEATHER.

Specification forming part of Letters Patent No. 194,551, dated August 28, 1877; application filed May 26, 1877.

*To all whom it may concern:*

Be it known that I, DENNIS FLANNERY, of Brooklyn, Kings county, New York, have invented Improvements in Composition for Treating Fabrics, Leather, &c., of which the following is the specification:

The object of my invention is a composition for surfacing and finishing leather, skins, fabrics, &c., whereby the desired effects are produced without discoloring the fabrics, and at a comparatively slight expense.

My improved composition consists, generally, of gum-shellac, white rosin, borax, gum-arabic, Irish moss, gum-tragacanth, flax-seed, and salt.

In preparing the mixture I dissolve four parts of borax in boiling water, add five parts of white rosin, ten parts of shellac, boil the mixture about five hours, and then reduce with water to four degrees, as indicated by a No. 1 shellac-glass; two parts of salt dissolved in water are then added, which sets the composition.

Thirty parts of gum-arabic are then dissolved in water, and reduced to ten degrees by a No. 1 shellac-glass.

Thirty parts of Irish moss are boiled in water two hours, and the decoction strained.

Five parts of gum-tragacanth are dissolved in water, and reduced to ten degrees by the glass, as above.

Five parts of flax-seed are boiled in water for two hours, and the decoction strained.

The five solutions or mixtures are mixed in proportions varying according to texture of the fabric to be treated. I prefer to use about two parts of No. 1, three parts of No. 2, five parts of No. 3, one part of No. 4, three parts of No. 5, reduced as may be required, according to the circumstances under which the material is used.

The article to be finished is either immersed in the composition, or the latter is applied with a brush to the surface, and after it is dry another coat may, if necessary, be added, the effect being to impart a fine surface, greater stiffness, and a hard finish.

I do not confine myself to the exact proportions and ingredients specified, for the proportions may be changed according to the material treated, and one of the rosins may be dispensed with, and only one of the mucilaginous gums need be used. The salt may also be replaced by any other material that will set the mixture.

I claim—

The within-described finishing composition, consisting of rosin, shellac, gum-arabic, Irish moss, gum-tragacanth, or equivalent resinous and mucilaginous gums, combined with borax solution and flax-seed, substantially as set forth.

In testimony whereof I have signed my name to this specification in the presence of two subscribing witnesses.

DENNIS FLANNERY.

Witnesses:
DAVID R. BROWN,
SAML. S. SHANNON.